United States Patent [19]
Patterson

[11] Patent Number: 5,922,205
[45] Date of Patent: Jul. 13, 1999

[54] SUPPRESSION OF THE FORMATION OF COLLOIDAL SUSPENSIONS BETWEEN TANKED FUEL OIL AND SEA WATER

[76] Inventor: James A. Patterson, 2074 20th St. Suite 115, Sarasota, Fla. 34237

[21] Appl. No.: 08/991,526

[22] Filed: Dec. 16, 1997

[51] Int. Cl.⁶ .................................................. C02F 1/40
[52] U.S. Cl. .................... 210/634; 210/693; 210/799; 210/747; 210/172; 210/242.4; 210/532.1; 210/540; 210/DIG. 5
[58] Field of Search .................................... 210/634, 690, 210/691, 693, 799, 170, 172, 242.4, 213, 532.1, 538, 540, 924, DIG. 5, 747

[56] References Cited

U.S. PATENT DOCUMENTS

| | | | |
|---|---|---|---|
| 3,096,204 | 7/1963 | Spangler et al. | 210/DIG. 5 |
| 3,179,603 | 4/1965 | Edwards et al. | |
| 3,729,410 | 4/1973 | Abadie et al. | |
| 3,800,944 | 4/1974 | Yost. | |
| 3,902,996 | 9/1975 | Murkes. | |
| 3,928,205 | 12/1975 | Seymour et al. | 210/242.4 |
| 4,167,482 | 9/1979 | Müller | 210/799 |
| 4,297,220 | 10/1981 | Meitzner et al. | |
| 4,805,343 | 2/1989 | Patterson et al. | |
| 4,860,577 | 8/1989 | Patterson. | |
| 4,928,427 | 5/1990 | Patterson. | |
| 4,981,097 | 1/1991 | Beyrosky | 210/242.4 |
| 5,177,897 | 1/1993 | Patterson. | |
| 5,229,015 | 7/1993 | Keep et al. | 210/DIG. 5 |
| 5,303,503 | 4/1994 | Patterson. | |
| 5,380,431 | 1/1995 | Newson | 210/924 |
| 5,460,726 | 10/1995 | Beyrosky | 210/693 |
| 5,596,493 | 1/1997 | Torini | 210/799 |

FOREIGN PATENT DOCUMENTS

| | | |
|---|---|---|
| 2914816 | 10/1979 | Germany. |
| 1611877 | 12/1990 | U.S.S.R.. |

OTHER PUBLICATIONS

"Standard Test Method for Tubidity of Water" ASTM Designation: D 1989–94, pp. 184–189.

*Primary Examiner*—Christopher Upton
*Attorney, Agent, or Firm*—Charles J. Prescott

[57] ABSTRACT

Pretreated tubular members, preferably in the form of hollow fiber segments, and a method for suppressing the formation of a colloid of fuel oil in sea water or visa versa in a ballast/fuel oil tank of a ship. The fuel oil-pretreated members are hydrophobic having a resultant density such that, when disposed into the fuel oil/ballast tank which is initially substantially colloid free, the pretreated tubular members sink in the fuel oil and become suspended at the interface of, or boundary between, fuel oil and ballast sea water to form a physical barrier which substantially maintains separation between fuel oil and sea water during subsequent ship movement at sea.

12 Claims, 2 Drawing Sheets

SUPPRESSION OF THE FORMATION OF COLLOIDAL SUSPENSIONS BETWEEN TANKED FUEL OIL AND SEA WATER

BACKGROUND OF THE INVENTION

1. SCOPE OF INVENTION

This invention relates generally to preventing fuel oil and sea water in a single container or tank from becoming colloidalized or physically emulsified with one another, and more particularly to such preventive measures within a diesel fuel oil/sea water ballast tank of a ship.

2. PRIOR ART

It is well known on ocean going vessels and ships to pump sea water into the ship's fuel oil tanks as the fuel oil is depleted from the tanks. The sea water is used as a ballast to maintain desired keel depth which, in turn, provides optimal operation of the ocean going vessel or ship.

Although this ballast maintenance technique is quite desirable, i.e. the replacement of fuel oil as used with sea water, this practice has presented vessel operators with certain problems which, heretofore, have remained unsolved. The motion of the ship at sea, as well as algae and proteins which are found in sea water, act to create a colloidal condition or suspension of oil droplets suspended in the sea water itself, and/or visa versa. Furthermore, during violent storms, the sea water can actually be caused to become suspended within the fuel oil.

When the fuel oil has been fully spent from each tank, it has been the practice to pump the sea water ballast back into the ocean before refilling the fuel tanks with fresh fuel oil. If oil droplets are found suspended in the discharged sea water, the purging of the tank results in a loss of emulsified or colloidalized fuel oil and also represents a serious environmental pollution problem.

Should sea water become suspended in the fuel oil to any substantial degree, the actual ship power plant may fail or become corroded. Such an occurrence often proves to be a dangerous condition in open seas.

The use of hollow fibers in conjunction with the absorption, transfer or displacement of liquids is well known. The following U.S. Patents are directed to the use of such hollow fibers:

| | |
|---|---|
| U.S. Pat. No. 4,805,343 | Patterson, et al. |
| U.S. Pat. No. 5,303,503 | Patterson |
| U.S. Pat. No. 5,177,897 | Patterson |
| U.S. Pat. No. 4,928,427 | Patterson |
| U.S. Pat. No. 4,860,577 | Patterson |

Applicant is also aware of a number of prior art U.S. patents which are related to the breaking down of existing emulsification or colloidal suspension of oil and water as follows:

| | |
|---|---|
| U.S. Pat. No. 3,179,603 | Edwards, et al. |
| U.S. Pat. No. 3,729,410 | Abadie, et al. |
| U.S. Pat. No. 3,800,944 | Yost |
| U.S. Pat. No. 3,902,996 | Murkes |
| U.S. Pat. No. 4,297,220 | Meitzner, et al. |

However, this group of prior art references merely deals with the rectification of an undesirable situation, that being the preexistence of the emulsification or colloid mixture of the oil and water, whereas the present invention deals with preventing its formation in the first instance.

BRIEF SUMMARY OF THE INVENTION

This invention is directed to pretreated tubular members, preferably in the form of hollow fiber segments, and a method for suppressing the formation of colloids of fuel oil in sea water or visa versa in a ballast/fuel oil tank of a ship. The fuel oil-pretreated members are hydrophobic having a resultant density such that, when disposed into the fuel oilballast tank which is initially substantially colloid free, the pretreated tubular members sink in the fuel oil and become suspended at the interface of, or boundary between, fuel oil and ballast sea water to form a physical barrier which substantially maintains separation between fuel oil and sea water during ship movement at sea.

It is therefore an object of this invention to provide a means for the prevention of the formation of a colloidal suspension or emulsion of oil and water within the ballast fuel oil-containing tank aboard a ship or vessel.

It is another object of this invention to employ short segments of hollow fibers as the preferred material, when properly pretreated, for establishing a barrier layer or boundary between fuel oil and sea water contained within a single ballast/fuel oil tank of a ship to be deployed into the tank at a time when the fuel oil and sea water are substantially separated and colloid-free.

It is yet another object of this invention to employ specifically pretreated segments of tubular members which are hydrophobic and have a resultant density after pretreating which allows them to sink in fuel oil down to the boundary layer between the fuel oil and sea water in a ballast/fuel oil tank of a ship to establish a physical barrier which prevents substantial further colloidalization or emulsification between the fuel oil and sea water when the ship or vessel is at sea.

In accordance with these and other objects which will become apparent hereinafter, the instant invention will now be described with reference to the accompanying drawings.

DETAILED DESCRIPTION OF THE INVENTION

Figure 1:
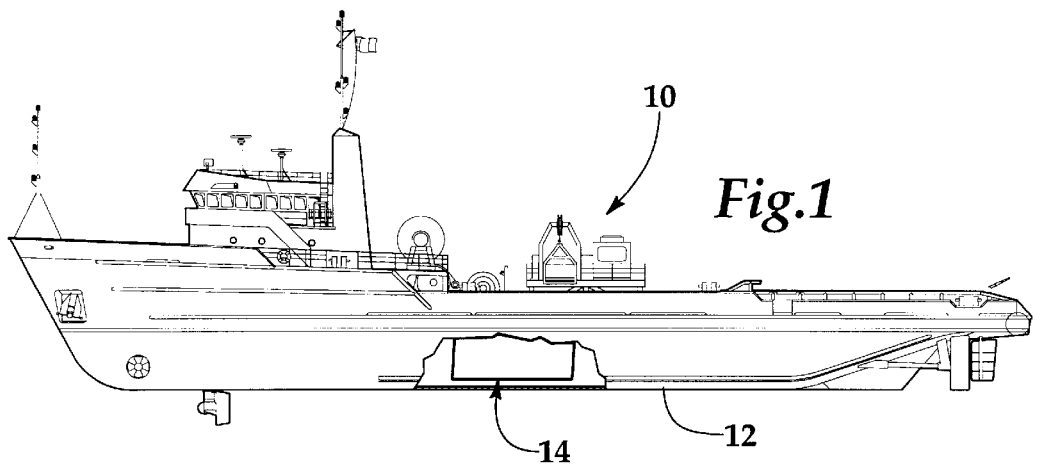
FIG. 1 is a broken pictorial view of a ship showing the approximate location of a typical ballast/fuel oil storage tank in the keel of the vessel.

Referring now to the drawings, a typical vessel or ocean going ship is shown in FIG. 1 generally at numeral 10 and includes all of the typical well known attributes and features of such vessels 10, including a hull 12 which is typically positioned below sea water level. Contained within the hull 12 are one or more tanks 14 which are primarily intended to hold fuel oil for supplying the ship power plants. At the start of each voyage, typically these tanks 14 are filled with fresh fuel oil which also serves to properly ballast or weight the vessel 10 to achieve a specific hull depth for optimal stabilization when the vessel 10 is at sea and in rough seas.

However, as the engine power plants (not shown) of the vessel 10 consume fuel oil and the tanks 14 begin to empty, the vessel 10 rises in the water, reducing the seaworthiness and stability of the vessel 10. Conventional practice for maintaining the vessel stability in proper ballast is to replace the consumed fuel oil in each tank 14 with sea water. The sea water having a higher density than that of fuel oil (1.02 g/cm versus 0.86 to 0.89 g/cm) settles or deposits in the lower portion of the tank 14, while the fuel oil remains directly above the sea water.

However, in the process of steadily flooding the tank 14 with sea water as it is emptied of fuel oil may cause some mixing or colloidalization of the two liquids within the tank 14. This detrimental effect is two fold. Where sea water may mix with the fresh fuel oil and become colloidalized therein, power plant damage or stoppage may occur. Where the fuel oil becomes colloidalized with the sea water, subsequent dumping of the sea water with colloidalized fuel oil therein may very well constitute an environmental hazard and be in violation of national or international laws controlling same.

TURBIDITY

The measurement of turbidity of a colloid or other liquid has become one standard means for obtaining the degree or amount of colloidalization. Turbidity is a numerical expression of the optical properties of a liquid sample in terms of the amount of light scattered and absorbed, rather than being transmitted in straight lines through a sample, the level of turbidity being caused by, and proportional to, the quantitative suspension and dissolved matter within the sample.

The measurement of turbidity and nephelometric turbidity is described and has been employed as described herebelow in accordance with ASTM D 1889-94, "Standard Test Method for Turbidity of Water". However, as described herebelow, the determination of saturated or fully colloidalized or emulsified fuel oil in water and visa versa as achieved only during the emulsifying mixing process and as reflected in the measurement of turbidity must be predicted to some extent as the actual measurement of sample turbidity at the instant of termination of agitation when the colloid is fully emulsified is not possible to obtain. The quantitative unit of turbidity is called "nephelometric turbidity unit" or NTU.

BASELINE TURBIDITY

Measurement of baseline turbidity was first completed on fully settled or quieted samples of #2 diesel fuel oil and sea water taken from the intercoastal waters along the west central Florida coastline in Sarasota, Fla. The very low turbidity readings for these initial unmixed samples were as follows:

| Sea Water | ... | 0.1 NTU |
|---|---|---|
| Diesel Fuel #2 | ... | 6.83 NTU |

To evaluate the turbidity change when a small quantity of #2 diesel duel was fully emulsified in a larger quantity of sea water and visa versa, two separate samples were prepared and mixed using the Brookfield emulsifier at a five inch horizontal stroke for a period of one half hour at 72 CPS. The first sample contained 200 cc of sea water and 0.5 cc of #2 diesel fuel. The second sample contained 200 cc of #2 diesel fuel and 0.5 cc of sea water. The samples were thoroughly emulsified and then subjected to turbidity light ray scattering examination.

Because the turbidity of each of these samples cannot be taken during mixing, the true emulsified turbidity level must be predicted. This prediction is necessary because, as soon as the mixing unit is stopped, the turbidity level begins to decrease almost instantaneously. Applicant utilized a technique of taking turbidity measurements with respect to the time shortly after the moment of mixing stoppage and then plotted those points of turbidity versus elapsed time (in seconds and minutes) from mixing stoppage and then projected the data points, which were essentially a straight line function, back to zero time. The following test results were determined by this technique:

|  | Emulsified Turbidity |
|---|---|
| TEST #1 | 157 NTU |
| (0.5 cc #2 Diesel Oil in 200 cc sea water) |  |
| TEST #2 | 47 NTU |
| (0.5 cc sea water in 200 cc #2 Diesel Oil) |  |

FUEL TANK SIMULATION

Figure 2:
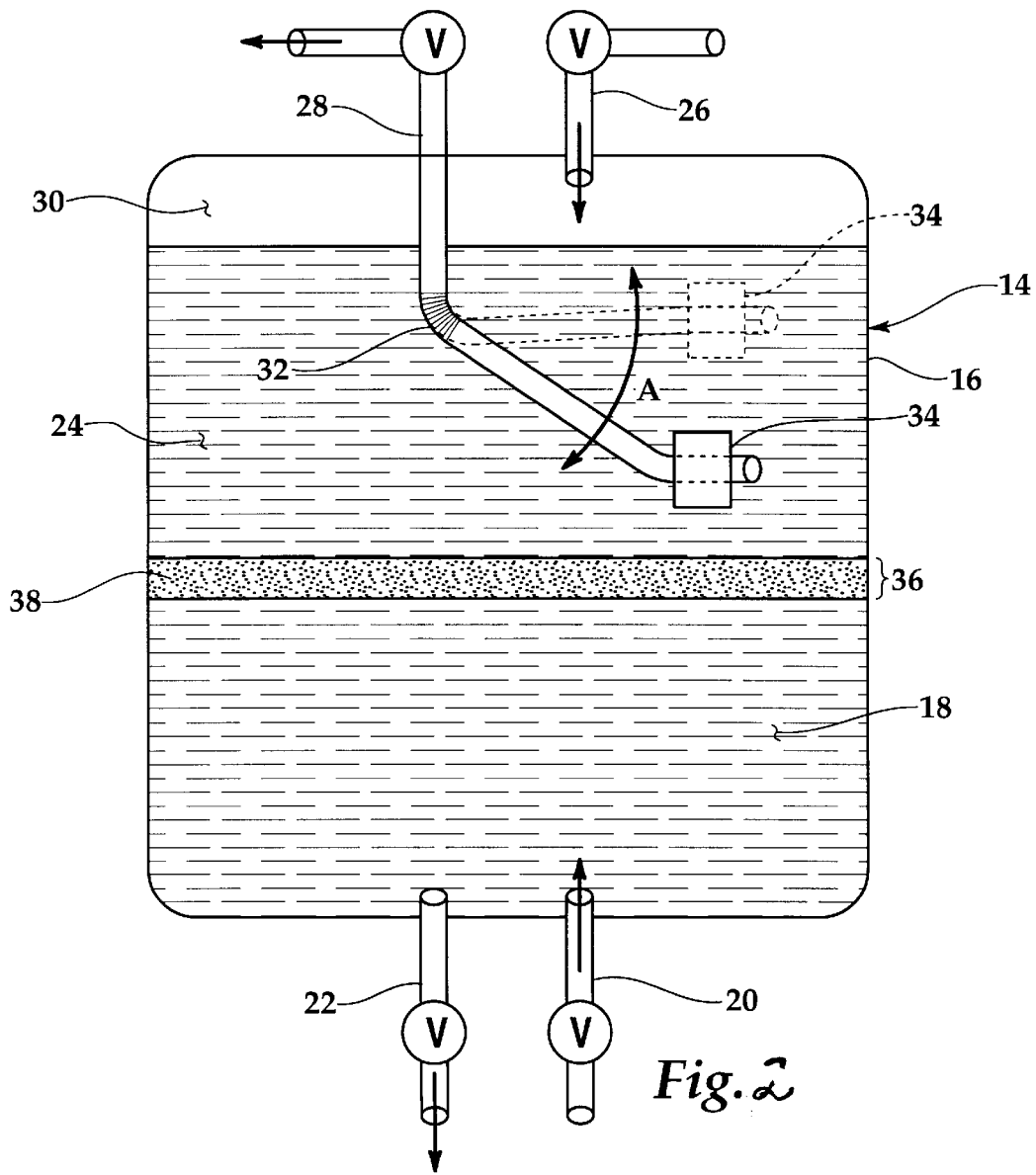
FIG. 2 is a simplified side elevation schematic view of the ballast/fuel oil storage tank of the ship of FIG. 1 substantially filled with a quantity of fuel oil and sea water and having the invention disposed therebetween.

In order to evaluate the present invention described herebelow in conditions similar to that which might be found within a fuel tank of a seagoing vessel as previously described in FIGS. 1 and 2, a test set up using a one liter container mounted for horizontal cyclic movement was utilized. A "wave machine" was built utilized as a mixing machine which produced a lateral or horizontal movement back and forth at a variable cyclic rate established at about 80 cpm. Displacement was adjusted to ± about 4.5 inches for a total stroke of about 9 inches.

These simulated ship fuel tank tests were conducted in three stages. Each test set up (Test #3) included 450 cc of #2 diesel fuel and 450 cc of sea water This test consisted of the mixing of these two ingredients within the closed container using the above wave machine experimental agitation set-up, the mixing occurring for a period of about 4½ hours. After this mixing, a sample was taken from the center of the sea water portion in the lower area of the container and an oil sample taken from the center of the upper portion of the test sample as the sea water, being heavier than the diesel oil, settled to the bottom of the container.

Again, because instantaneous turbidity readings are not possible, the turbidity of the sample during the mixing process had to be predicted by taking time incremented turbidity readings after the wave machine was stopped. This data was again plotted on a turbidity (NTU) versus time graph and projected back to time zero. The following turbidity readings were obtained:

| TEST #3 | Oil | Sea Water |
|---|---|---|
| (450 cc #2 Diesel Oil; 450 cc Sea Water) | 18.6 NTU | 53.2 NTU |

PRETREATED HOLLOW CORE FIBER SEGMENTS

In preparation for conducting Test #4, segments of hollow core fibers having an inside diameter range of about 1 to 3 mm, a length of 1 to 6 mm, preferably about 1.4 mm, and a wall thickness of 0.05 to 0.15 mm were prepared. These HCF segments, preferably of flexible hollow semipermeable, cellulose acetate fibers formed into tubular lengths of constant dimensions, were then immersed in a clean sample of #2 diesel fuel oil as used aboard ships. The density of the HCF segments prior to treatment is about 0.1 g/cm$^3$ when filled with air and would clearly float atop #2 diesel which has a density of about 0.86 to 0.89 g/cm$^3$. The density of sea water utilized in all of these experiments had a density of about 1.02 g/cm$^3$. The density of the material utilized in forming the HCF segments was about 1.20 g/cm$^3$. However, when immersed and filled with #2 diesel oil, the net density reduced down to 0.90 to 0.92 g/cm$^3$ which is just slightly higher than the density of #2 diesel oil of 0.86 to 0.89 g/cm$^3$. In addition to becoming just slightly more dense than #2 diesel oil, the pretreated HCF segments also become hydrophobic.

Test #4 included one aspect of the evaluation of the present invention. Pretreated hollow core fiber segments as above described having a total weight of 9.3 grams were deposited into the container used in the above described Test #3 and were placed into this container only moments after the contents had been thoroughly mixed for about four and one half hours. This Test #4 sample was again remixed and the turbidity measurements were taken in the manner above described as shown as follows:

| TEST #4 | Oil | Sea Water |
| --- | --- | --- |
| (450 cc #2 Diesel Oil; 450 cc Sea Water; 9.3 g of Hollow Core Fiber Segments Added After Mixing) | 18.9 NTU | 87.1 NTU |

Test #5 was essentially the same in terms of ingredients as those of Test #4 except that the pretreated hollow core fiber segments were added to the container prior to any mixing of the diesel oil and sea water. That is to say, the hollow core fiber segments were added in a situation which would simulate the settled and fully separated condition of diesel fuel oil and sea water which would exist in the tanks when the ship is in harbor or in quiet seas. After the pretreated hollow core fiber segments were added, the contents were subjected to four and one half hours of mixing by the wave machine. Turbidity was predicted at time zero by taking samples from the center of the oil and water separately and subjected to turbidity readings at several different points in time following termination of the mixing and then used to plot and predict the turbidity at time zero.

The following turbidity results were obtained:

| TEST #5 | Oil | Sea Water |
| --- | --- | --- |
| (450 cc #2 Diesel Oil; 450 cc Sea Water 9.3 g of Hollow Core Fiber) Segments Added to Unmixed Contents) | 8.0 NTU | 8.7 NTU |

HOLLOW CORE FIBER (HCF) EFFECTIVENESS

By adding the hollow core fiber segments into the container filled with 450 cc of #2 diesel oil and 450 cc of sea water which had been allowed to settle into two separate substantially homogenous layers within the container, the pretreated HCF segments settled to the interface level between the diesel oil and sea water due to the resultant density of the pretreated segments. When they settled to this interface level between diesel oil and sea water, it was observed by applicant that they collectively formed a virtually physically impervious blanket or boundary layer therebetween. Subsequent mixing of this Test #5 sample (above) clearly showed the HCF boundary layer to remain intact and to substantially prevent the oil from penetrating or diffusing downwardly therethrough into the sea water and also substantially preventing sea water from penetrating or diffusing upwardly therethrough into the oil. This is verified by comparison of the turbidity readings from Tests #3, #4 and #5 wherein the turbidity readings in Test #5 are substantially lower with respect to the turbidity of both oil and sea water which clearly supports this conclusion.

PREDICTION OF DIFFUSION

Figure 3:
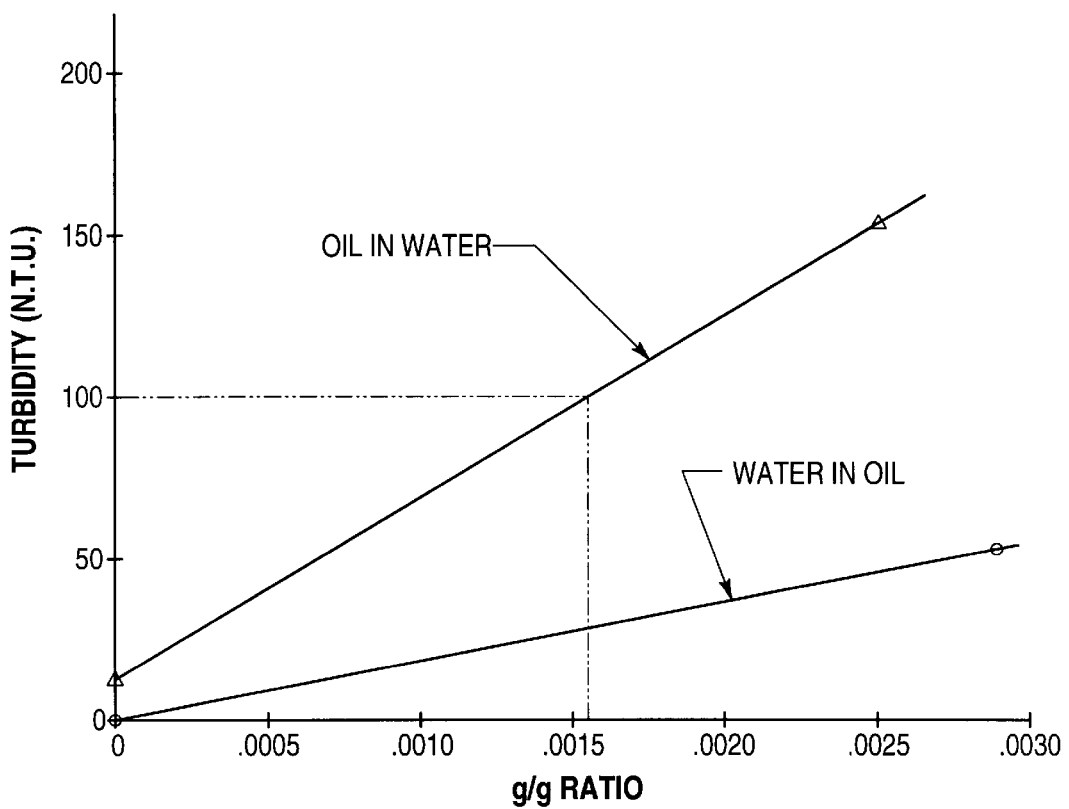
FIG. 3 is a graph relating turbidity (NTU) to the ratio of water in oil and oil in water by weight.

In order to predict the level of separation, or conversely the level of undesirable diffusion of sea water in fuel oil or fuel oil in sea water, a portion of the above data was further analyzed and displayed in FIG. 3 graphically. The first data points which were plotted were the baseline turbidity readings in NTU as represented in the vertical scale of FIG. 3. These pure samples of sea water and #2 diesel fuel were presumed to have no dispersed amounts of diesel #2 oil in the sea water and no sea water in the #2 fuel sample. Therefore, the g/g weight ratio is presumed to be zero for both of these data points.

The second set of data points were taken from Tests #1 and #3 wherein a specific small quantity (0.5 cc) of fuel oil was emulsified in 200 cc of sea water and, separately, 0.5 cc of sea water was emulsified in 200 cc of #2 diesel fuel. Converting these volume ratios into rate ratios using the above densities produced a g/g ratio of water in oil of 0.0029 g/g, while this ratio for oil in water was calculated to be 0.0022 g/g. These ratios were plotted versus the above values of turbidity, 157 NTU in Test #1 and 47 NTU in Test #2.

The data lines of FIG. 3 may now be used to predict the ratio of grams of #2 diesel oil in water and, separately, of sea water in #2 diesel fuel by merely knowing the measured level of turbidity of a sample of known general contamination. So, for example, with respect to a test sample taken from a ship's fuel tank from the upper portion of the tank which contains primarily diesel fuel oil with some emulsified sea water contained therein, and finding that this sample has a turbidity reading of 100, the upper curve in FIG. 3 as shown in phantom would predict a rate ratio of approximately 0.00158 grams of sea water in each gram of the fuel oil.

Although the use of hollow core fibers is preferred in this disclosure, the utilization of other tubular segments of a generally similar size and density nature are envisioned within the scope of this invention so that, when pretreated with diesel fuel oil by immersion and filling of such segments, the resultant density is in the range of 0.90 to 0.92 g/cm$^3$, just slightly heavier than the #2 diesel oil as used by engines aboard ships. Likewise, the overall size, diameter and length of such segments may be varied within the scope of this invention so long as they have the primary physical capability of capillary absorption of the #2 diesel oil into the inner volume of each segment so as to produce the above desired resulting density. By being coated with and filled with the #2 diesel oil, these segments becoming hydrophobic are quite resistant to being driven below the interface between the diesel fuel and the sea water and when collectively forming a physical barrier at this interface, the defusion of diesel oil downwardly into the sea water or the sea water upwardly through the boundary layer into the diesel oil, even in heavy seas and rolling conditions of a vessel is highly unlikely, if not substantially reduced altogether.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A method of suppressing the formation of a colloidal suspension between fuel oil and sea water in a ballast/fuel oil tank of a ship comprising the steps of:

A. pretreating loose segments of hollow fibers each open at each end thereof by coating substantially all interior surfaces thereof with fuel oil;

B. suspending hollow fibers in said tank at an interface between said fuel oil and said sea water before said tank has been substantially agitated and before said fuel oil and said sea water have become substantially or partially colloidalized about a boundary region therebetween;

C. allowing said hollow fibers to remain substantially stationary in said tank for a time period sufficient to form a physical barrier layer between said fuel oil and said sea water which substantially prevents any further colloidalization of fuel oil and sea water.

2. A method of suppressing the formation of a colloidal suspension between fuel oil and sea water as set forth in claim 1, wherein:

said segments are substantially filled with fuel oil and become hydrophobic during step A.

3. A method of suppressing the formation of a colloidal suspension between fuel oil and sea water as set forth in claim 2, wherein:

said hollow fibers have a resultant density after step A in the range of 0.9 to 1.01 g/cc.

4. A method of suppressing the formation of a colloidal suspension between fuel oil and sea water as set forth in claim 3, wherein:

said hollow fibers have a length of about 0.8 to 6.0 cm and an inside diameter of about 1 to 3 mm.

5. A method forming a physical barrier layer between fuel oil and sea water while stored in a ballast/fuel oil tank of a ship, said barrier layer substantially suppressing the formation of a colloidal suspension of fuel oil and sea water during ship movement at sea comprising the steps of:

A. pretreating loose segments of hollow fibers each open at each end thereof by coating substantially all interior surfaces thereof with fuel oil;

B. suspending hollow fibers in said tank at an interface between said fuel oil and said sea water before said tank has been substantially agitated and before said fuel oil and said sea water have become substantially or partially colloidalized at a boundary region therebetween;

C. allowing said hollow fibers to remain substantially stationary in said tank for a time period sufficient to form a barrier layer between said fuel oil and said sea water which substantially prevents colloidalization of fuel oil and sea water.

6. A method of suppressing the formation of a colloidal suspension between fuel oil and sea water as set forth in claim 5, wherein:

said hollow fibers are substantially filled with fuel oil and become hydrophobic during step A.

7. A method of suppressing the formation of a colloidal suspension between fuel oil and sea water as set forth in claim 6, wherein:

said hollow fibers have a resultant density after step A of about 0.90 to 1.01 g/cc.

8. A method of suppressing the formation of a colloidal suspension between fuel oil and sea water as set forth in claim 7, wherein:

said hollow fibers have a length of about 0.8 to 6.0 cm and an inside diameter in the range of 1 to 3 mm.

9. Pretreated hollow fibers which produce a physical barrier layer between fuel oil and sea water in a ballast/fuel oil tank of a ship comprising:

individual segments of hollow fibers each open at each end thereof;

each said segment pretreated to be hydrophobic by immersion in fuel oil whereby an interior volume of each said segment is substantially filled with fuel oil and the resultant density of each said pretreated segment is about 0.90 to 1.01 g/cc;

whereby, said hollow fibers being disposed into said tank while there is no substantial colloidalization present between fuel oil and sea water simultaneously being stored in said tank, said hollow fibers providing means to form a barrier layer at the boundary between said fuel oil and said sea water which substantially suppresses subsequent colloidalization of fuel oil and sea water in said tank while the ship is at sea.

10. Pretreated hollow fibers as set forth in claim 9, wherein:

said hollow fibers have a length of about 0.8 to 6.0 cm and an inside diameter of about 1 to 3 mm.

11. A method of suppressing the formation of a colloidal suspension between fuel oil and sea water in a ballast/fuel oil tank of a ship comprising the steps of:

A. pretreating loose segments of hollow tubular members each open at each end thereof by coating substantially all interior surfaces thereof with fuel oil; said hollow tubular members being substantially filled with fuel oil and becoming hydrophobic having a resultant density of about 0.90 to 1.01 g/cc during step A;

B. suspending hollow tubular members in said tank at an interface between said fuel oil and said sea water before said tank has been substantially agitated and before said fuel oil and said sea water have become substantially colloidalized at a boundary region therebetween;

C. allowing said hollow tubular members to remain substantially stationary in said tank for a time period sufficient to form a barrier layer between said fuel oil and said sea water.

12. A method of suppressing the formation of a colloidal suspension between fuel oil and sea water as set forth in claim 11, wherein:

said hollow tubular members have a length of about 0.8 to 6.0 cm and an inside diameter of about 1 to 3 mm.

* * * * *